(12) United States Patent
Honda et al.

(10) Patent No.: US 6,733,039 B2
(45) Date of Patent: May 11, 2004

(54) DAMPER MECHANISM FOR STEERING DEVICE

(75) Inventors: Kazuhide Honda, Tokyo (JP); Hideaki Okamoto, Tokyo (JP); Toshimi Soeda, Tokyo (JP); Yasuo Nanjo, Kurashiki (JP)

(73) Assignees: Mitsubishi Jidosha Kogyo Kabushiki Kaisha, Tokyo (JP); Mizushima Press Co., Ltd., Okayama (JP)

( * ) Notice: Subject to any disclaimer, the term of this patent is extended or adjusted under 35 U.S.C. 154(b) by 62 days.

(21) Appl. No.: 10/173,075

(22) Filed: Jun. 18, 2002

(65) Prior Publication Data

US 2002/0190450 A1 Dec. 19, 2002

(30) Foreign Application Priority Data

Jun. 18, 2001 (JP) ........................................ 2001-183792

(51) Int. Cl.⁷ ................................................. B62D 1/16
(52) U.S. Cl. .................................... 280/780; 267/141.2
(58) Field of Search ................................ 280/780, 779; 74/492; 267/281, 141.2–141.5, 141

(56) References Cited

U.S. PATENT DOCUMENTS

| | | | | |
|---|---|---|---|---|
| 1,572,519 A | * | 2/1926 | Davis | 74/492 |
| 2,272,900 A | * | 2/1942 | Saurer | 464/91 |
| 3,486,396 A | * | 12/1969 | Yoshioka | 74/492 |
| 4,667,530 A | * | 5/1987 | Mettler et al. | 74/493 |
| 5,243,874 A | * | 9/1993 | Wolfe et al. | 74/493 |
| 5,460,574 A | * | 10/1995 | Hobaugh | 464/162 |
| 5,507,203 A | * | 4/1996 | Audibert et al. | 74/492 |
| 6,135,224 A | * | 10/2000 | Thomas et al. | 180/78 |
| 6,149,526 A | * | 11/2000 | Boersma et al. | 464/89 |
| 6,283,867 B1 | * | 9/2001 | Aota et al. | 464/74 |
| 6,343,993 B1 | * | 2/2002 | Duval et al. | 464/167 |
| 6,481,700 B1 | * | 11/2002 | Fujii | 267/140.11 |
| 6,530,599 B1 | * | 3/2003 | Oka | 280/777 |

FOREIGN PATENT DOCUMENTS

| | | |
|---|---|---|
| JP | 58-50105 Y2 | 11/1983 |
| JP | 5-116636 | 5/1993 |
| JP | 9-72347 | 3/1997 |

* cited by examiner

*Primary Examiner*—Jack Lavinder
*Assistant Examiner*—Benjamin A Pezzlo
(74) *Attorney, Agent, or Firm*—Birch, Stewart, Kolasch & Birch, LLP

(57) ABSTRACT

A damper mechanism includes an outer pipe and an inner member. The outer pipe has first inward convex portions, second inward convex portions, and concave grooves extending along the axial direction and alternately formed in the circumferential direction at the inner periphery thereof. Outward convex portions are formed in the circumferential direction at a plurality of portions on the outer periphery of the inner member. An elastic body is provided between the outer pipe and the inner member. The elastic body includes thick wall portions and thin wall portions. The thick wall portion is provided between one side face of the outward convex portion and the first inward convex portion. The thin wall portion is provided between the other side face of the outward convex portion and the second inward convex portion.

8 Claims, 4 Drawing Sheets

DAMPER MECHANISM FOR STEERING DEVICE

CROSS-REFERENCE TO RELATED APPLICATIONS

This application is based upon and claims the benefit of priority from the prior Japanese Patent Application No. 2001-183792, filed Jun. 18, 2001, the entire contents of which are incorporated herein by reference.

BACKGROUND OF THE INVENTION

1. Field of the Invention

The present invention relates to a damper mechanism used for an automobile steering device.

2. Description of the Related Art

An automobile steering device includes a steering shaft rotating integrally with a steering wheel, a steering column rotatably supporting the steering shaft, and a shaft assembly transferring the rotation of the steering shaft to the steering gear side. Also, it is known in the art to provide steering devices equipped with a damper mechanism (elastic shaft coupling), commonly referred to as a steering damper, in order to prevent the transfer of micro-vibrations generated on a wheel side to the steering wheel side.

Conventional damper mechanisms include an outer pipe, an inner member inserted into the outer pipe, and a rubber-like elastic body mounted between the outer pipe and the inner member, as disclosed in Japanese Patent Laid-Open No. 9-72347 and No. 5-116636.

In the damper mechanism, the micro-vibrations transferred from the steering gear side is absorbed in the range in which the elastic body can be deformed. When the steering wheel is rotated for steering, the outer pipe and the inner member are relatively displaced in the twisting direction. As long as the displacement (twist angle) is small, the elastic body is deformed in the direction of twisting (shearing direction). When an input exceeding a predetermined twist angle is applied, a stopper operates, and thus torque is transferred between the outer pipe and the inner member.

In the conventional damper mechanisms, the elastic body is subjected to a shearing force. Therefore, problems arise with durability if the elastic body is made of rubber. When the spring constant of the elastic body is decreased to improve the absorptive property of the micro-vibrations transferred from the steering gear side, problems arise in steering performance in the range of a normal steering angle (when the steering wheel is handled). However, when the spring constant of the elastic body is set high, the micro-vibrations transferred from the steering gear side cannot be absorbed sufficiently.

BRIEF SUMMARY OF THE INVENTION

Accordingly, it is an object of the present invention to provide a damper mechanism for a steering device capable of effectively absorbing microvibrations transferred from the steering gear side and improving steering performance in the range of a normal steering angle.

A damper mechanism according to the present invention includes an outer pipe, an inner member, and an elastic body. Inward convex portions and concave grooves extending along the axial direction are alternately formed in the circumferential direction at a plurality of positions of the inner periphery of the outer pipe. Outward convex portions extending along the axial direction are formed in the circumferential direction at a plurality of positions of the outer periphery of the inner member. The elastic body is provided between the outer pipe and the inner member.

In the damper mechanism of the invention, in the range of a minute twist angle, the elastic body is deformed in the direction of compression between the inward convex portions of the outer pipe and the outward convex portions of the inner member, thereby absorbing micro-vibrations. In the range of a normal steering angle, the inward convex portions are brought into engagement with the outward convex portions and both of them rotate integrally, thereby transferring torque.

In this invention, preferably, the elastic body includes a thick wall portion provided between one side of the outward convex portion of the inner member and a first inward convex portion of the outer pipe and a thin wall portion provided between the other side of the outward convex portion and a second inward convex portion, thereby increasing the spring constant with an increase in the twist angle. More preferably, a clearance is held between the thin wall portion and the second inward convex portion. The clearance allows the outer pipe and the inner member to be relatively displaced at a minute angle in the twisting direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the invention will next be described with reference to FIGS. 1 to 5.

Figure 1:
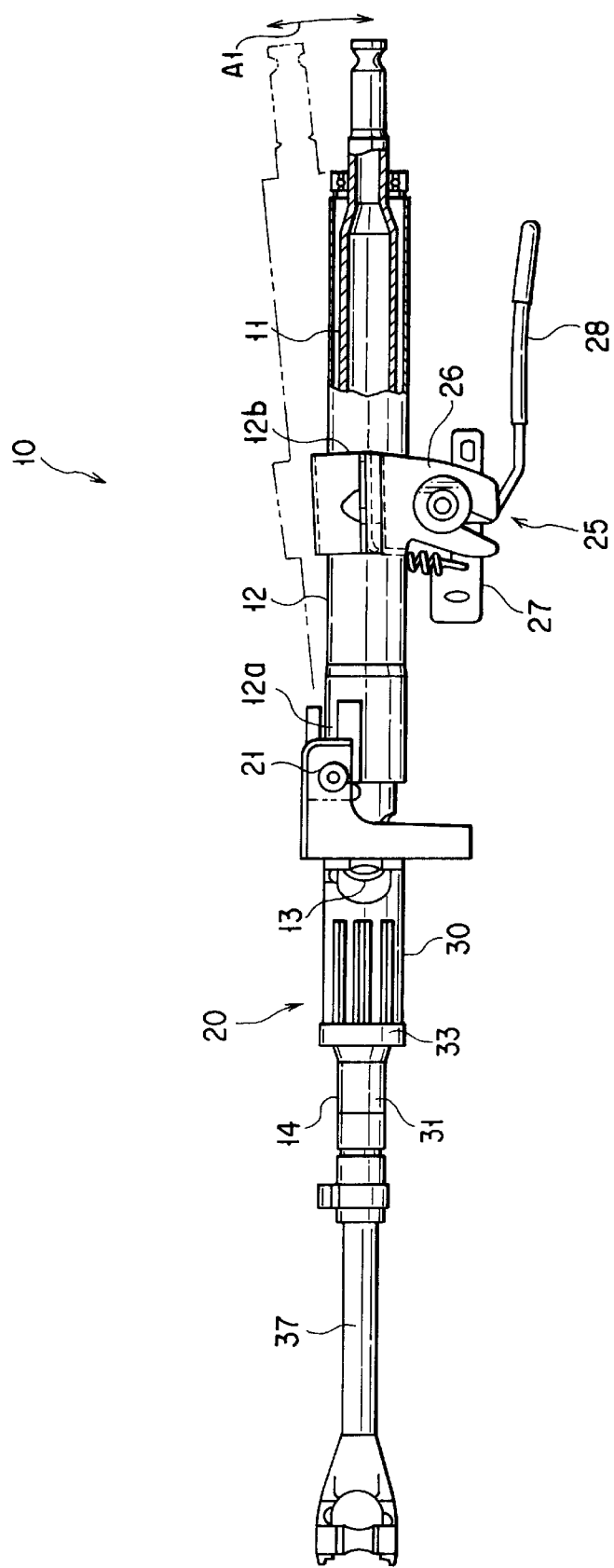
FIG. 1 is a side view of a steering device having a damper mechanism according to an embodiment of the present invention.

FIG. 1 shows an automobile steering device 10. The steering device 10 includes a steering shaft 11 to which a well-known steering wheel (not shown) is mounted, a cylindrical steering column 12 rotatably supporting the steering shaft 11, and a shaft assembly 14 connected to the steering shaft 11 via a universal coupling 13. The shaft assembly 14 has a damper mechanism 20 at the midpoint of the length of the shaft assembly 14.

An end portion 12a of the steering column 12 is supported such that it can be tilted around a pivotally supporting member 21 in the direction shown by the arrow A1. A tilt lock mechanism 25 is provided at the midpoint 12b of the length of the steering column 12. The tilt lock mechanism 25 includes a tilt bracket 26 moving with the steering column 12 in the direction of the arrow A1 and a tilt lever 28 capable of moving the tilt bracket 26 between a position to fix it to a base member 27 on a vehicle side and a position to release it.

Figure 2:
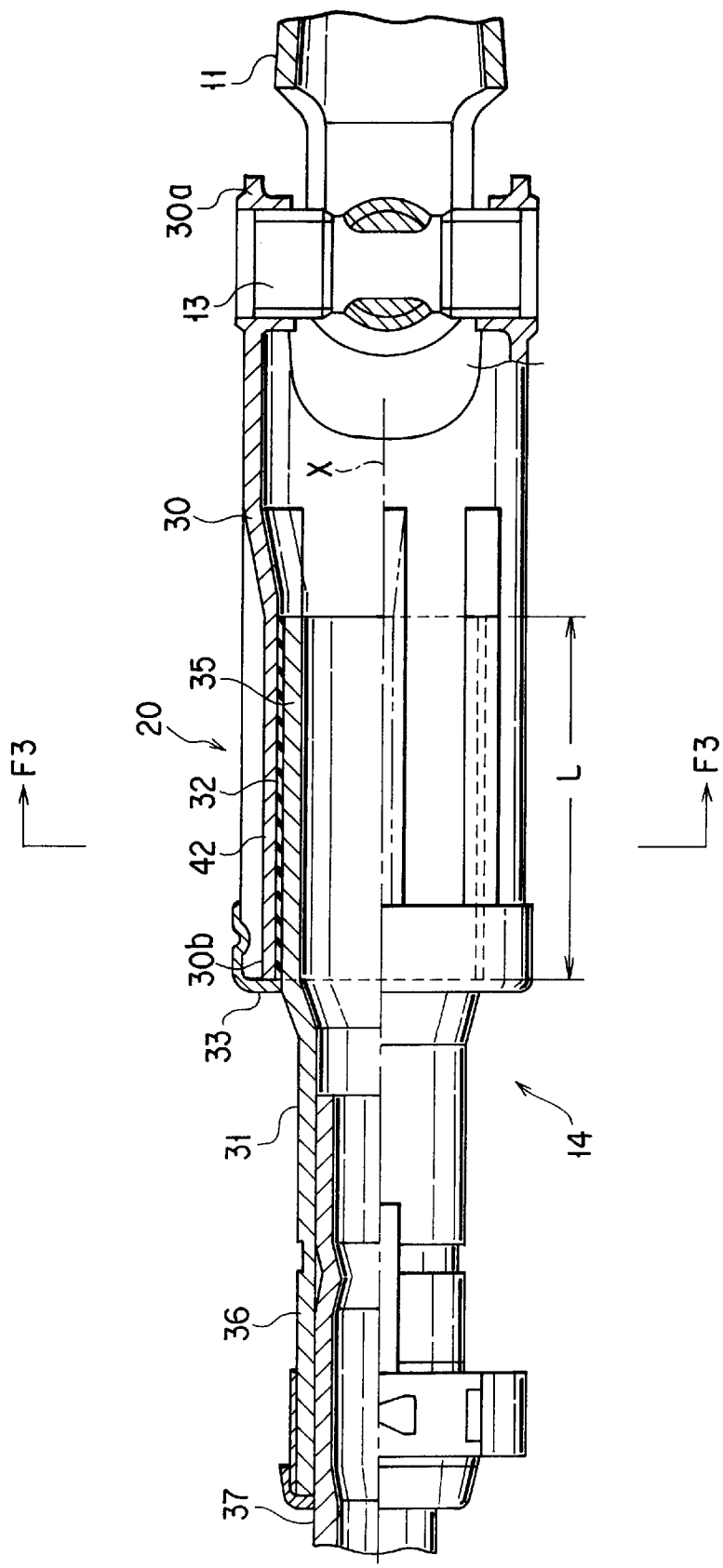
FIG. 2 is an enlarged side view, partly in section, of the damper mechanism of the steering device shown in FIG. 1.
Figure 3:
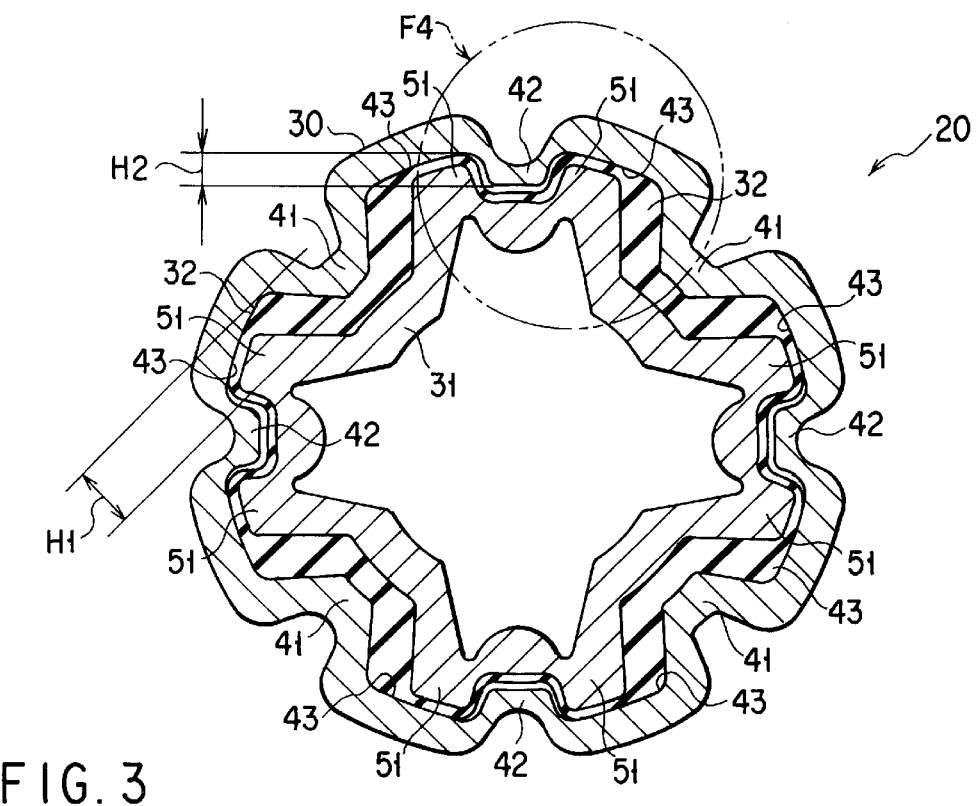
FIG. 3 is a cross-sectional view of the damper mechanism taken on line F3—F3 in FIG. 2.
Figure 4:
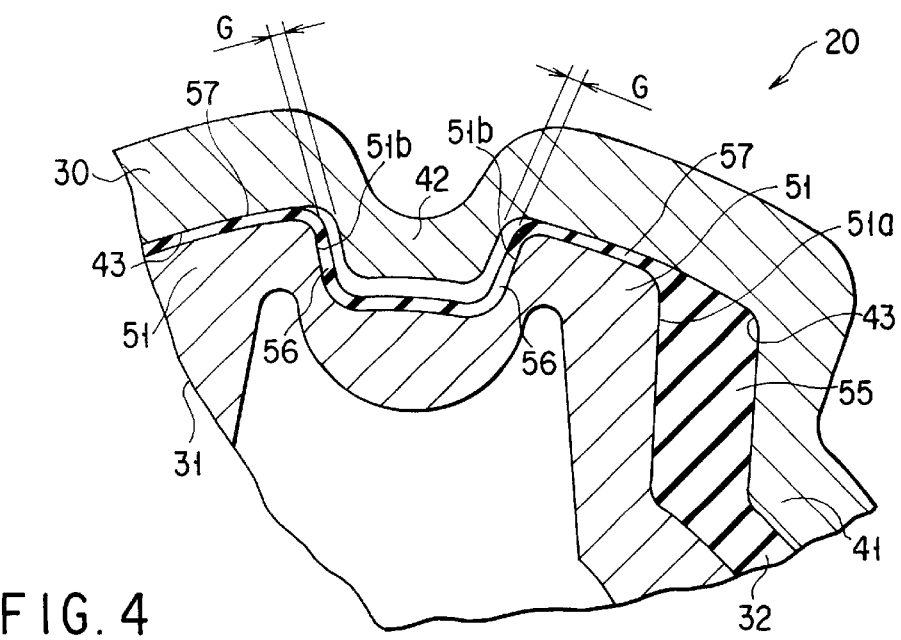
FIG. 4 is an enlarged view of a part encircled by F4 in FIG. 3.

The damper mechanism 20 is configured as shown in FIGS. 2 to 4. The damper mechanism 20 includes an outer pipe 30 made of metal, a hollow inner member 31 made of metal, and an elastic body 32 made of a material having rubber-like elasticity. The outer pipe 30 has a universal coupling 13 on one end portion 30a side thereof. The outer pipe 30 also has a cap 33 on the other end portion 30b thereof.

The inner member 31 shaped like a pipe includes a portion 35 to be inserted into the outer pipe 30 and a portion 36 projecting outward from the outer pipe 30. The portion 36 projecting outward is connected to a shaft main body 37 extending toward a steering gear (not shown).

First inward convex portions 41 and second inward convex portions 42 extending along the direction of the axis X (shown in FIG. 2) are formed in the circumferential direction at a plurality of positions on the inner periphery of the outer pipe 30, as shown in FIG. 3. The projection height H2 of the second inward convex portion 42 is lower than the projection height H1 of the first inward convex portion 41. As shown in FIG. 3, the first inward convex portions 41 and the second inward convex portions 42 are alternately formed, between which concave grooves 43 are formed along the direction of the axis X.

Outward convex portions 51 extending along the direction of the axis X are formed at a plurality of circumferential positions to be inserted into the outer pipe 30 on the outer periphery of the inner member 31. The outward convex portions 51 are each fitted in the concave groove 43 between the first inward convex potion 41 and the second inward convex potion 42.

An elastic body 32 made of rubber (e.g. natural rubber or chemical rubber), elastomer, or the like is provided between the outer pipe 30 and the inner member 31 at the whole portion where the outer pipe 30 and the inner member 31 overlap each other. The elastic body 32 has thick wall portions 55, thin wall portions 56, and connecting portions 57, as shown in FIG. 4, on an enlarged scale, and is shaped like a cylinder extending over a length L in the direction of the axis X in FIG. 2.

The thick wall portion 55 is provided between one side face 51a of the outward convex portion 51 and the first inward convex portion 41. The thin wall portion 56 is provided between the other side face 51b of the outward convex portion 51 and the second inward convex portion 42. The connecting portion 57 connects the thick wall portion 55 and the thin wall portion 56.

The elastic body 32 is formed in such a manner that the outer periphery of the inner member 31 is covered by a mold, a material of the elastic body 32 is fed between the mold and the inner member 31, and is subjected to vulcanizing treatment, thereby molding the elastic body 32 and, at the same time, vulcanization-gluing the elastic body 32 onto the outer periphery of the inner member 31. Therefore, since the elastic body 32 is wholly glued to the inner member 31 which overlaps the outer pipe 30, it is possible to automate the gluing and increase the productivity. The inner member 31, to which the elastic body 32 is thus attached, is pressed into the outer pipe 30 together with the elastic body 32. The elastic body 32 is locked with the cap 33 to prevent it slipping out from the outer pipe 30.

The thick wall portion 55 occupies the space between the first inward convex portion 41 and the outward convex portion 51 without clearance, as shown in FIG. 4. On the other hand, the thin wall portion 56 is provided between the second inward convex portion 42 and the outward convex portion 51 with a clearance G. The clearance G allows the outer pipe 30 and the inner member 31 to be relatively displaced at a very small angle in the twisting direction. Moreover, another clearance exists between a tip portion of the second inward convex portion 42 facing the inner member 31, and a concave portion, which faces the tip portion, formed on the inner member 31.

When the elastic body 32 is vulcanize-bonded to the inner member 31, as in this embodiment, the clearance G is formed between the second inward convex portion 42 and the thin wall portion 56. On the other hand, when the elastic body 32 is vulcanize-bonded to the outer pipe 30, the clearance G is formed between the outward convex portion 51 and the thin wall portion 56.

Figure 5:
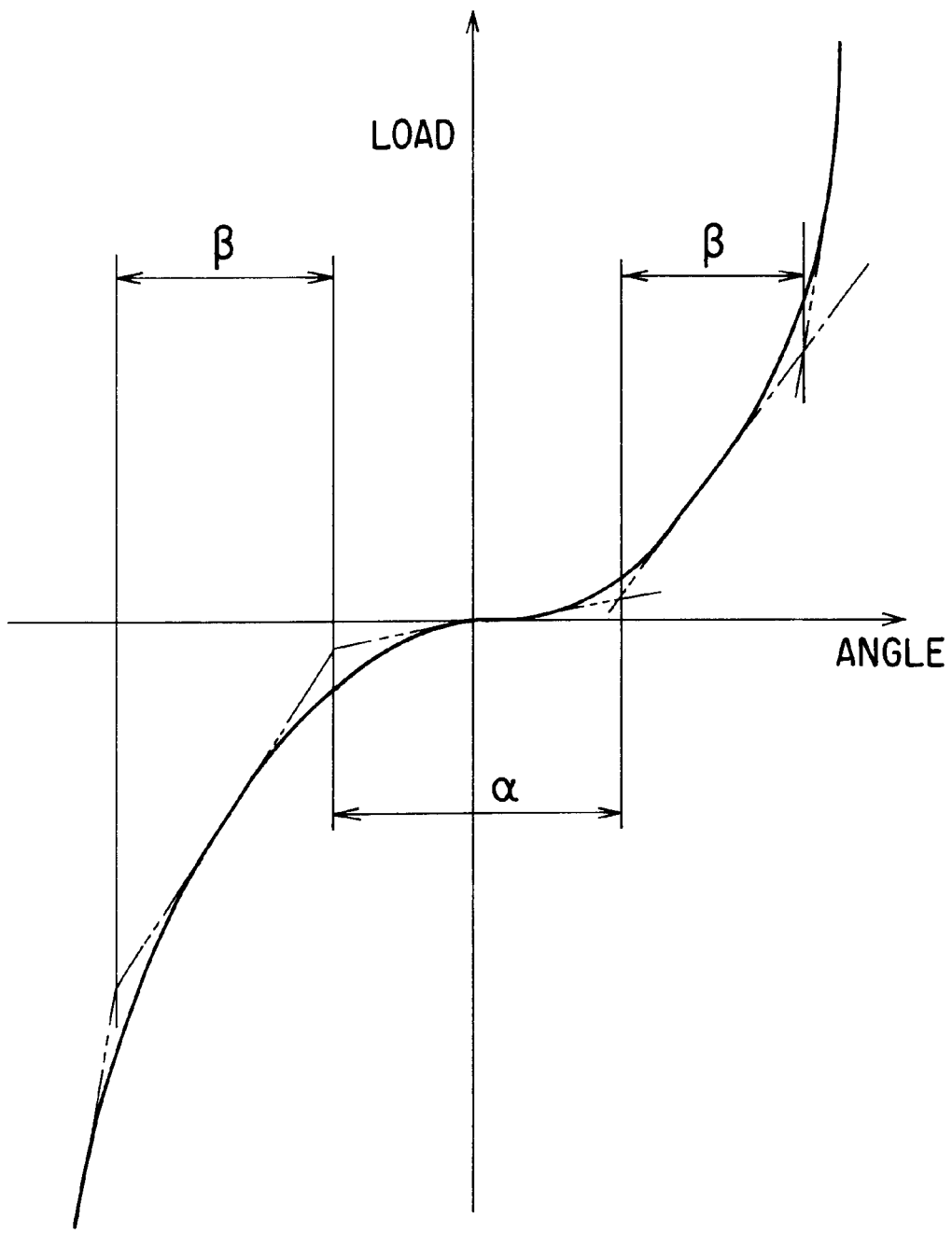
FIG. 5 is an explanatory view showing the relationship between the twist angle and the load of the damper mechanism of the steering device shown in FIG. 1.

With the damper mechanism 20 having the above configuration, when the outer pipe 30 and the inner member 31 are relatively rotated in the twisting direction, the thick wall portion 55 of the elastic body 32 is deformed in the range of the clearance G, in the range of a minute twist angle. Therefore, a small spring constant, indicated by $\alpha$ in FIG. 5, is obtained in the range of a minute angle, thus allowing minute vibrations to be effectively absorbed.

When the twist angle exceeds the aforesaid range of the minute angle, the clearance G is eliminated, so that the second inward convex portion 42 is brought into contact with the thin wall portion 56, and the torque in the twisting direction is transferred to the outward convex portion 51 via the inward convex portion 42. In this case, since the deform in the compressing direction of the thin wall portion 56 reaches the limit, the spring constant increases, as indicated by $\beta$ in FIG. 5. In other words, the spring constant is increased stepwise with an increase in a twist angle.

Incidentally, the projection height H2 of the second inward convex portion 42 is formed lower than the projection height H1 of the first inward convex portion 41 (H1>H2), as described above. The elastic body 32 between the outer pipe 30 and the inner member 31 is disposed to extend over a length L along the direction of axis X.

When the height H2 of the second inward convex portion 42 is set as high as the height H1 of the first inward convex portion 41, the area in which the second inward convex portion 42 abuts on the thin wall portion 56 increases, so that even the thin wall portion 56 has a low spring constant, thus having a soft property as a whole. In other words, the property indicated by $\beta$ in FIG. 5 is hardly obtained. In this embodiment, since the contact area of the second inward convex portion 42 with the thin wall portion 56 can be decreased as much as possible by reducing the projection height H2 of the second inward convex portion 42, a desired property can be obtained.

In the range of a normal steering angle, since the outer pipe 30 and the inner member 31 are rotated integrally via the second inward convex portion 42 and the outward convex portion 51, the steering force (torque) inputted to the outer pipe 30 is transferred to the shaft main body 37 via the inner member 31.

Also, in the damper mechanism 20, when the outer pipe 30 and the inner member 31 are relatively rotated in the twisting direction, the thick wall portion 55 and the thin wall portion 56 of the elastic body 32 deflect in the direction of compression, substantially applying no shearing force to the elastic body 32. Accordingly, the elastic body 32 is less prone to degradation, thereby increasing durability.

Also, in the damper mechanism 20 of this embodiment, since the inward convex portions 41 and 42 and the outward convex portion 51 can vibrate infinitesimally along the direction of the axis X, micro-vibrations in the direction of the axis X due to hydraulic variations of a power steering mechanism, which may be transferred from the shaft main body 37 to the inner member 31 side, can be absorbed by the elastic body 32. Accordingly, the transfer of micro-vibrations along the direction of the axis X and noise to the steering wheel side can also be reduced.

It is to be understood that when embodying the present invention, various changes and modification of the components of the invention, such as an outer pipe, an inner member, an inward convex portion of the outer pipe, an outward convex portion of the inner member, and an elastic body, can be made by one skilled in the art without departing from the spirit or scope of the invention.

According to the embodiment, when the outer pipe and the inner member are relatively rotated, in the range of a minute twist angle, the elastic body is deformed in the direction of compression between the inward convex portion of the outer pipe and the outward convex portion of the inner member, thereby absorbing micro-vibrations, and in the range of a normal steering angle, the outer pipe and the inner member can be rotated integrally via the inward convex portion and the outward convex portion. Since the elastic body is deformed mainly in the direction of compression, high durability can be obtained as compared with a case in which a shearing force is applied.

Moreover, since the thick wall portion of the elastic body deflects in the range of a minute twist angle, the spring constant is small, and since the inward convex portion of the outer pipe and the outward convex portion of the inner member are brought into engagement with each other via the thin wall portion as the twist angle increases, the spring constant can be increased.

Additionally, since the spring constant can be sufficiently decreased in the range of the clearance, in the range of a minute twist angle, micro-vibrations can effectively be absorbed, and when the twist angle is increased, the clearance is eliminated, so that the spring constant is increased and the outer pipe and the inner member are substantially integrated in the range of a normal steering angle, thereby transferring steering torque.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A damper mechanism for a steering device, comprising:
   an outer pipe having inward convex portions and concave grooves extending along an axial direction on an inner periphery side and alternately formed at a plurality of positions in a circumferential direction;
   an inner member inserted into the outer pipe and having outward convex portions extending along the axial direction on an outer periphery side and fitted in concave grooves between the inward convex portions formed at a plurality of positions in the circumferential direction; and
   an elastic body provided between the inward convex portions of the outer pipe and the outward convex portions of the inner member, the elastic body including a thick wall portion provided between one side face of at least one of the outward convex portions of the inner member and a first inward convex portion of the outer pipe, and a thin wall portion provided between the outer side face of at least one of the outward convex portions and a second inward convex portion of the outer pipe, wherein the elastic body is configured such that a spring constant increases with an increase in a relative twist angle between the outer pipe and the inner member.

2. The damper mechanism for the steering device according to claim 1, wherein:
   a clearance is defined by the thin wall portion of the elastic body and one of the second inward convex portion and the outward convex portion.

3. A damper mechanism for a steering device, comprising:
   an outer pipe having inward convex portions and concave grooves extending along an axial direction on an inner periphery side and alternately formed at a plurality of positions in a circumferential direction;
   an inner member inserted into the outer pipe and having outward convex portions extending along the axial direction on an outer periphery side and fitted in concave grooves between the inward convex portions formed at a plurality of positions in the circumferential direction; and
   an elastic body provided between the inward convex portions of the outer pipe and the outward convex portions of the inner member, the elastic body including a thick wall portion provided between one side face of at least one of the outward convex portions of the inner member and a first inward convex portion of the outer pipe, and a thin wall portion provided between the outer side face of at least one of the outward convex portions and a second inward convex portion of the outer pipe, wherein the elastic body is configured such that a spring constant increases with an increase in a relative twist angle between the outer pipe and the inner member,
   wherein the projection height of the second inward convex portion is lower than the projection height of the first inward convex portion.

4. A damper mechanism for a steering device, comprising:
   an outer pipe having inward convex portions and concave grooves extending along an axial direction on an inner periphery side and alternately formed at a plurality of positions in a circumferential direction;
   an inner member inserted into the outer pipe and having outward convex portions extending along the axial direction on an outer periphery side and fitted in concave grooves between the inward convex portions formed at a plurality of positions in the circumferential direction; and
   an elastic body provided between the inward convex portions of the outer pipe and the outward convex portions of the inner member, the elastic body including a thick wall portion provided between one side face of at least one of the outward convex portions of the inner member and a first inward convex portion of the outer pipe, and a thin wall portion provided between the outer side face of at least one of the outward convex portions and a second inward convex portion of the outer pipe, wherein the elastic body is configured such that a spring constant increases with an increase in a relative twist angle between the outer pipe and the inner member, wherein the elastic body further includes a connecting portion for connecting the thick wall portion and the thin wall portion.

5. The damper mechanism for the steering device according to claim 4, wherein:

a clearance is defined by the thin wall portion of the elastic body and one of the second inward convex portion and the outward convex portion.

6. The damper mechanism for the steering device according to claim 4, wherein the projection height of the second inward convex portion is lower than the projection height of the first inward convex portion.

7. The damper mechanism for the steering device according to claim 3, wherein the elastic body further includes a connecting portion for connecting the thick wall portion and the thin wall portion.

8. The damper mechanism for the steering device according to claim 3, wherein:

a clearance is defined by the thin wall portion of the elastic body and one of the second inward convex portion and the outward convex portion.

* * * * *